UNITED STATES PATENT OFFICE.

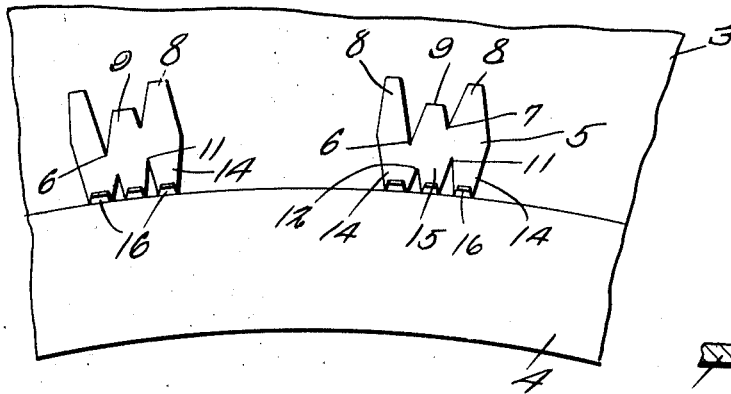

TOMMY JOSEPH CONVERSE, OF BELLINGHAM, WASHINGTON.

REINFORCEMENT FOR TIRE-CASINGS.

1,313,792. Specification of Letters Patent. Patented Aug. 19, 1919.

Application filed January 2, 1919. Serial No. 269,189.

*To all whom it may concern:*

Be it known that I, TOMMY JOSEPH CONVERSE, a citizen of the United States, residing at Bellingham, in the county of Whatcom and State of Washington, have invented a new and useful Reinforcement for Tire-Casings, of which the following is a specification.

It is the object of this invention to provide a novel reinforcement adapted to be applied to rim-cut tire casings.

Within the scope of what is claimed, a mechanic may make changes without departing from the spirit of the invention.

In the drawings:—

Figure 1 shows a side elevation, a portion of a tire casing whereunto one form of the invention has been applied; Fig. 2 is a cross section of the structure shown in Fig. 1; Fig. 3 is a side elevation showing a portion of a tire casing whereunto a modified form of the invention has been applied; and Fig. 4 is a cross section of the structure shown in Fig. 3.

In carrying out the invention as shown in Figs. 1 and 2, the numeral 1 designates a rim having a clencher flange 2. A tire casing 3 coöperates with the rim 1 and includes a bead 4 coöperating with the clencher flange 2 and defining a groove 40. The numeral 5 designates a plate, preferably made of metal. In its outer edge, the plate 5 is provided with notches 6 and 7, the notch 6 being deeper than the notch 7. The notches 6 and 7 define terminal arms 8 and an intermediate arm 9. All of the arms 8 and 9 are of different lengths, the arms being of tapered construction, as clearly shown in Fig. 1. The outer ends of the terminal arms 8 are in alinement, whereas the outer end of the intermediate arm 9 is set back somewhat from a line tangent to the outer ends of the arms 8. The arms 8 and 9 terminate in bendable prongs 10 clenched in the tire casing 3. In the inner edge of the plate 5, notches 11 and 12 are formed, these notches like the notches 6 and 7 being V-shaped. The notch 11 is deeper than the notch 12. The notches 11 and 12 define terminal inner arms 14 and an intermediate terminal arm 15. The notches 11 and 12 are of tapered construction, as Fig. 1 will disclose. The outer ends of all of the arms 14 and 15 are in alinement, and merge into hooks 16, seated in the groove 40 of the tire casing 3, and adapted to coöperate with the clencher flange 2 when the casing is rim-cut, as will be understood readily by those skilled in the art.

In Figs. 3 and 4, wherein a modified form of the invention is shown, parts hereinbefore alluded to have been designated by numerals previously used, with the suffix "a." In this form of the invention, the plate $5^a$ has but a single hook $16^a$, the plate being attached to the tire casing $3^a$ by means of rivets 17. The plates 5 are applied to the tire casing 3 in spaced relation, circumferentially of the casing, and at any desired distances apart, this observation holding true with respect to the plates $5^a$ of Fig. 3. Any desired sort of metal may be used in the making of the plates 5 and $5^a$.

Owing to the specific form given to the plate 5, the same will possess great strength with a minimum expenditure of material, and in this connection it is to be observed that the deeper notch 11 in the inner edge of the plate is disposed opposite, or approximately opposite, to the shallower notch 7 in the outer edge of the plate, the deeper notch 6 in the outer edge of the plate being disposed approximately opposite to the shallower notch 12 in the inner edge of the plate. Since the arm 9 is shorter than the arms 8, all of the clenching prongs 10 will not engage the tire casing 3 in the same line and, consequently, the possibility of tearing the tire casing is reduced to a minimum.

Having thus described the invention, what is claimed is:—

1. A reinforcement for tire casings, comprising a plate provided in its opposite edges with notches defining first and second arms, the first arms terminating in clenching prongs and the second arms terminating in hooks, the notches in the respective edges of the plate being of different lengths, whereby the first arms will be of different lengths and whereby the second arms will be of different lengths.

2. A reinforcement for tire casings comprising a plate provided in its opposite edges with notches defining first and second arms, the first arms terminating in clenching prongs, and the second arms terminating in
5 hooks, the outer end of one of the first arms being set inwardly from the outer ends of the other first arms.

In testimony that I claim the foregoing as my own, I have hereto affixed my signature in the presence of two witnesses.

TOMMY JOSEPH CONVERSE.

Witnesses:
   WILLIAM McCUSH,
   E. E. CONVERSE.